United States Patent
Wang et al.

(10) Patent No.: US 12,293,494 B2
(45) Date of Patent: May 6, 2025

(54) METHODS AND SYSTEMS FOR VIDEO STABILIZATION

(71) Applicant: ZHEJIANG DAHUA TECHNOLOGY CO., LTD., Zhejiang (CN)

(72) Inventors: Tingniao Wang, Hangzhou (CN); Xiaomu Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 458 days.

(21) Appl. No.: 17/646,684

(22) Filed: Dec. 31, 2021

(65) Prior Publication Data

US 2022/0122230 A1 Apr. 21, 2022

Related U.S. Application Data

(63) Continuation of application No. PCT/CN2019/130391, filed on Dec. 31, 2019.

(30) Foreign Application Priority Data

Jul. 5, 2019 (CN) .......................... 201910605353.7

(51) Int. Cl.
  *G06K 9/00* (2022.01)
  *G06T 5/73* (2024.01)
  *G06T 7/246* (2017.01)

(52) U.S. Cl.
  CPC ................ *G06T 5/73* (2024.01); *G06T 7/246* (2017.01); *G06T 2207/10016* (2013.01)

(58) Field of Classification Search
  CPC .. G06T 7/73; G06T 7/246; G06T 5/73; G06T 2207/10016
  See application file for complete search history.

(56) References Cited

U.S. PATENT DOCUMENTS

2010/0118156 A1   5/2010   Saito
2014/0267801 A1*  9/2014   Grundmann ......... H04N 23/683
                                              348/208.1
(Continued)

FOREIGN PATENT DOCUMENTS

CN      101009021 A     8/2007
CN      101316368 A     12/2008
(Continued)

OTHER PUBLICATIONS

International Search Report in PCT/CN2019/130391 mailed on Apr. 2, 2020, 4 pages.
(Continued)

*Primary Examiner* — Gregory A Morse
*Assistant Examiner* — Owais Iqbal Memon
(74) *Attorney, Agent, or Firm* — METIS IP LLC

(57) ABSTRACT

A method for video stabilization may include obtaining a target frame of a video; obtaining a plurality of first feature points associated with the target frame; determining whether the plurality of first feature points include at least one feature point relating to a moving object in the video; in response to a determination that the plurality of first feature points include at least one feature point relating to the moving object in the video, removing the at least one feature point relating to the moving object; performing video stabilization to the target frame based on remaining first feature points of the plurality of first feature points; determining, in the target frame, at least one supplement feature point; and designating the at least one supplement feature point and the remaining first feature points as second feature points associated with a frame immediately following the target frame in the video.

20 Claims, 8 Drawing Sheets

(56) References Cited

U.S. PATENT DOCUMENTS

| | | | | |
|---|---|---|---|---|
| 2014/0362240 A1* | 12/2014 | Klivington | ........... | H04N 23/683 |
| | | | | 348/208.1 |
| 2015/0256755 A1* | 9/2015 | Wu | ...................... | H04N 23/681 |
| | | | | 348/208.6 |
| 2017/0309031 A1* | 10/2017 | Wu | ......................... | G06T 7/246 |
| 2018/0359418 A1 | 12/2018 | Wang et al. | | |
| 2019/0045126 A1 | 2/2019 | Takeuchi | | |
| 2019/0045127 A1 | 2/2019 | Takeuchi | | |

FOREIGN PATENT DOCUMENTS

| | | |
|---|---|---|
| CN | 101321241 A | 12/2008 |
| CN | 101854465 A | 10/2010 |
| CN | 103813056 A | 5/2014 |
| CN | 104135597 A | 11/2014 |
| CN | 104599288 A | 5/2015 |
| CN | 106101616 A | 11/2016 |
| CN | 106210447 A | 12/2016 |
| CN | 108109175 A | 6/2018 |
| CN | 109194878 A | 1/2019 |
| CN | 109697689 A | 4/2019 |
| CN | 109922258 A | 6/2019 |
| WO | 2021004041 A1 | 1/2021 |

OTHER PUBLICATIONS

Written Opinion in PCT/CN2019/130391 mailed on Apr. 2, 2020, 5 pages.

First Office Action in Chinese Application No. 201910605353.7 mailed on Mar. 16, 2020, 11 pages.

Feng Liu et al., Subspace Video Stabilization, ACM Transactions on Graphics, 30(1): 4:1-4:10, 2011.

Shuaicheng Liu et al., MeshFlow: Minimum Latency Online Video Stabilization, European Conference on Computer Vision, 2016, 16 pages.

Shuaicheng Liu et al., Bundled Camera Paths for Video Stabilization, ACM Transactions on Graphics, 32(4):78:1-78:10, 2013.

The Extended European Search Report in European Application No. 19936983.6 mailed on Jul. 18, 2022, 9 pages.

* cited by examiner

METHODS AND SYSTEMS FOR VIDEO STABILIZATION

CROSS-REFERENCE TO RELATED APPLICATIONS

This application is a continuation of International Application No. PCT/CN2019/130391, filed on Dec. 31, 2019, which claims priority of Chinese Patent Application No. 201910605353.7 filed on Jul. 5, 2019, the entire contents of each of which are hereby incorporated by reference in its entirety.

TECHNICAL FIELD

The present disclosure generally relates to image processing, and more specifically relates to methods and systems for video stabilization.

BACKGROUND

During capturing videos or images, image capture devices, such as a camera may inevitably shake, which affects the visual effect of the captured videos or images. Therefore, it is necessary to eliminate or reduce the effect of the camera's shake on the captured videos or images. The existing video stabilization methods usually include optical video stabilization and electronic video stabilization. The optical video stabilization achieves the video stabilization by moving the lens or photosensitive element in the camera. The electronic video stabilization includes video stabilization based on sensors and video stabilization based on algorithms. The optical video stabilization and the electronic video stabilization based on sensors incurs a higher cost and has less flexibility than the electronic video stabilization based on algorithms. The existing electronic video stabilization based on algorithms, however, is usually based on global motion parameters. The existing electronic video stabilization based on algorithms involves a larger operation amount and a lower processing speed, and is, thus, difficult to apply to real-time video stabilization. Therefore, it is desirable to provide systems and/or methods for video stabilization to perform real-time video stabilization with a lower cost, a higher flexibility, a less operation amount, and a faster processing speed.

SUMMARY

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

According to an aspect of the present disclosure, a system for video stabilization may include one or more storage devices and one or more processors configured to communicate with the one or more storage devices. The one or more storage devices may include a set of instructions. When the one or more processors executing the set of instructions, the one or more processors may be directed to perform one or more of the following operations. The one or more processors may obtain a target frame of a video. The target frame may be different from a first frame of the video. The one or more processors may obtain a plurality of first feature points associated with the target frame. The one or more processors may determine whether the plurality of first feature points include at least one feature point relating to a moving object in the video. In response to a determination that the plurality of first feature points include at least one feature point relating to the moving object in the video, the one or more processors may remove the at least one feature point relating to the moving object. The one or more processors may perform video stabilization to the target frame based on remaining first feature points of the plurality of first feature points. The one or more processors may determine, in the target frame, at least one supplement feature point that is different from the remaining first feature points. The one or more processors may designate the at least one supplement feature point and the remaining first feature points as second feature points associated with a frame immediately following the target frame in the video.

In some embodiments, to perform the video stabilization to the target frame based on the remaining first feature points of the plurality of first feature points, the one or more processors may estimate one or more first motion parameters based on the remaining first feature points. The one or more processors may perform video stabilization to the target frame by performing route planning or filtering based on the one or more first motion parameters.

In some embodiments, to estimate the one or more first motion parameters based on the remaining first feature points, the one or more processors may obtain current coordinates of the remaining first feature points in the target frame. The one or more processors may obtain prior coordinates of the remaining first feature points in a frame prior to the target frame in the video. The one or more processors may compare the current coordinates and the prior coordinates. The one or more processors may estimate the one or more first motion parameters based on a comparison result.

In some embodiments, the one or more processors may determine whether the target frame is a second frame of the video.

In some embodiments, the target frame may be the second frame of the video. To obtain the plurality of first feature points associated with the target frame, the one or more processors may obtain the first frame of the video that is prior to the target frame. The one or more processors may determine a plurality of third feature points in the first frame. The one or more processors may designate the plurality of third feature points as the plurality of first feature points.

In some embodiments, to determine whether the plurality of first feature points include at least one feature point relating to the moving object in the video, the one or more processors may determine current coordinates of the plurality of first feature points in the target frame. The one or more processors may obtain historical coordinates of the plurality of first feature points in a source frame. The plurality of first feature points may be determined in the source frame. The one or more processors may estimate one or more second motion parameters based on the current coordinates and the historical coordinates of the plurality of first feature points. The one or more processors may transform the current coordinates of the plurality of first feature points based on the one or more second motion parameters. For each of the plurality of first feature points, the one or more processors may determine a difference between the historical coordinates and the transformed current coordinates of the first feature point. The one or more processors may determine whether the difference is greater than a preset threshold. In response to a determination that the difference is greater than the preset threshold, the one or more processors may designate the first feature point as the feature point relating to the moving object.

In some embodiments, the historical coordinates of the plurality of first feature points in the source frame may include coordinates that are transformed based on one or more third motion parameters associated with the source frame.

In some embodiments, the one or more processors may create a data group configured to store the historical coordinates of the plurality of first feature points. To remove the at least one feature point relating to the moving object, the one or more processors may remove the historical coordinates of the at least one feature point relating to the moving object from the data group. To designate the at least one supplement feature point and the remaining first feature points as the second feature points associated with the frame immediately following the target frame in the video, the one or more processors may add historical coordinates of the at least one supplement feature point to the data group. The historical coordinates of the at least one supplement feature point may include coordinates that are transformed based on one or more fourth motion parameters associated with the target frame.

In some embodiments, to determine, in the target frame, the at least one supplement feature point that is different from the remaining first feature points, the one or more processors may determine a plurality of candidate feature points in the target frame. The one or more processors may randomly select at least one of the plurality of candidate feature points as the at least one supplement feature point. A count of the at least one supplement feature point may be equal to a count of the at least one removed first feature point.

In some embodiments, in response to a determination that the plurality of first feature points include no feature point relating to the moving object in the video, the one or more processors may perform video stabilization to the target frame based on the plurality of first feature points. The one or more processors may designate the plurality of first feature points as the second feature points associated with the frame immediately following the target frame in the video.

According to another aspect of the present disclosure, a method for video stabilization may include one or more of the following operations. One or more processors may obtain a target frame of a video. The target frame may be different from a first frame of the video. The one or more processors may obtain a plurality of first feature points associated with the target frame. The one or more processors may determine whether the plurality of first feature points include at least one feature point relating to a moving object in the video. In response to a determination that the plurality of first feature points include at least one feature point relating to the moving object in the video, the one or more processors may remove the at least one feature point relating to the moving object. The one or more processors may perform video stabilization to the target frame based on remaining first feature points of the plurality of first feature points. The one or more processors may determine, in the target frame, at least one supplement feature point that is different from the remaining first feature points. The one or more processors may designate the at least one supplement feature point and the remaining first feature points as second feature points associated with a frame immediately following the target frame in the video.

According to yet another aspect of the present disclosure, a system for video stabilization may include an obtaining module configured to obtain a target frame of a video. The target frame may be different from a first frame of the video. The system may also include a feature point tracking module configured to obtain a plurality of first feature points associated with the target frame. The system may also include a processing module configured to determine whether the plurality of first feature points include at least one feature point relating to a moving object in the video. In response to a determination that the plurality of first feature points include at least one feature point relating to the moving object in the video, the processing module may be further configured to remove the at least one feature point relating to the moving object. The processing module may be further configured to perform video stabilization to the target frame based on remaining first feature points of the plurality of first feature points. The processing module may be further configured to determine, in the target frame, at least one supplement feature point that is different from the remaining first feature points. The processing module may be further configured to designate the at least one supplement feature point and the remaining first feature points as second feature points associated with a frame immediately following the target frame in the video.

According to yet another aspect of the present disclosure, a non-transitory computer readable medium may comprise at least one set of instructions for video stabilization. The at least one set of instructions may be executed by one or more processors of a computer server. The one or more processors may obtain a target frame of a video. The target frame may be different from a first frame of the video. The one or more processors may obtain a plurality of first feature points associated with the target frame. The one or more processors may determine whether the plurality of first feature points include at least one feature point relating to a moving object in the video. In response to a determination that the plurality of first feature points include at least one feature point relating to the moving object in the video, the one or more processors may remove the at least one feature point relating to the moving object. The one or more processors may perform video stabilization to the target frame based on remaining first feature points of the plurality of first feature points. The one or more processors may determine, in the target frame, at least one supplement feature point that is different from the remaining first feature points. The one or more processors may designate the at least one supplement feature point and the remaining first feature points as second feature points associated with a frame immediately following the target frame in the video.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
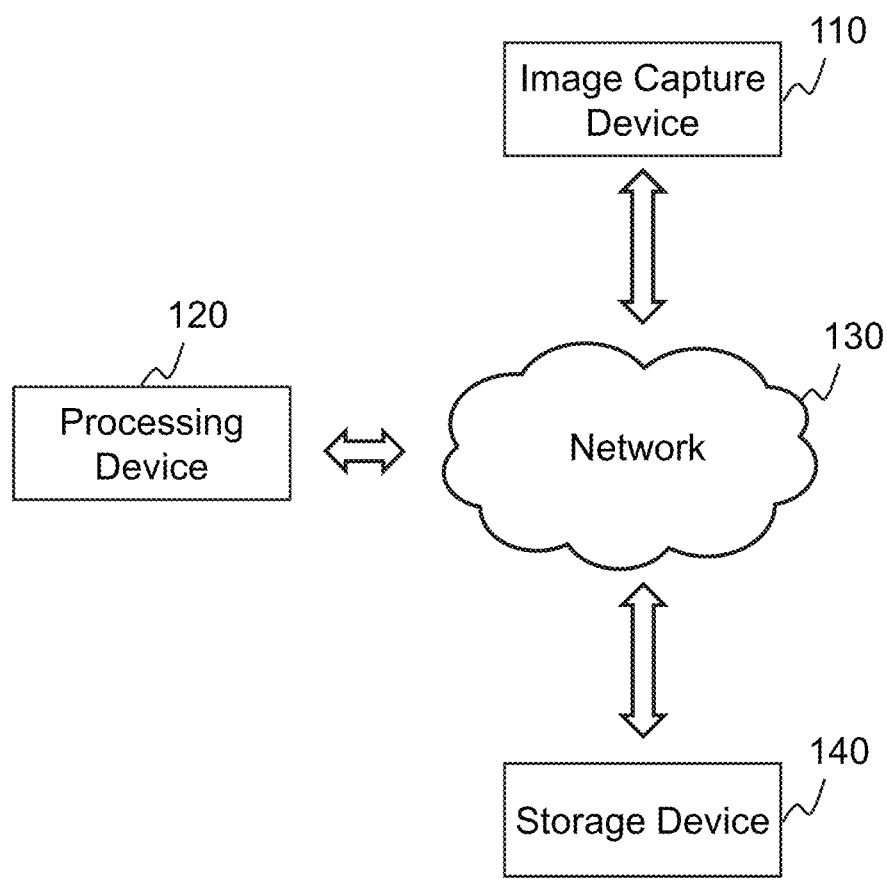
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, module, systems, devices, and/or drivers have been described at a relatively high-level, without detail, in order to avoid unnecessarily obscuring aspects of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," and/or "unit" used herein are one method to distinguish different components, elements, parts, section or assembly of different level in ascending order. However, the terms may be displaced by other expressions if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

At present, existing electronic video stabilization based on algorithms usually adopts operations such as feature point detection, feature point tracking, motion estimation, motion planning or filtering, motion compensation, or the like. However, in the operation for motion estimation, at least one of the feature point pairs corresponding to a moving object is often used to determine a motion equation, which causes errors in motion estimation. Because the video stabilization is performed to a video frame-by-frame, the errors may accumulate, which affects the accuracy of the operations performed to subsequent frames.

In addition, for the electronic video stabilization that includes an operation for removing outliers in the detected feature points, since one or more of the detected feature points that are determined as the outliers are removed, in the process for video stabilization performed frame-by-frame, the number of the feature points to be tracked may become fewer and fewer. When a count of the feature points to be tracked reduces to a certain value, an operation for feature point detection may be performed to the current frame to be processed to determine a plurality of new feature points, which causes a sudden change in the number (or count) of feature points, resulting in video stuttering.

In order to solve the above problems, the present disclosure provides systems and/or methods for stabilizing a video in real-time. In the systems and/or methods for video stabilization provided in the present disclosure, a first frame of a video may be obtained. The video may include a plurality of consecutive frames. The first frame may be the first one of the plurality of consecutive frames. A plurality of first feature points may be determined in the first frame by performing feature point detection to the first frame. The plurality of feature points may be designated as the feature points to be tracked in the second frame of the video. One or more of the plurality of first feature points corresponding to a moving object may be removed. First parameter estimation may be performed based on the remaining first feature points. Route planning or filtering may be performed based on a result of the first parameter estimation. A motion compensation may be performed to the second frame based on a result of the route planning or filtering. One or more second feature points may be determined in the second frame. The one or more second feature points and the remaining first feature points may be designated as the feature points to be tracked in the third frame of the video. The one or more second feature points may be different from the remaining first feature points. Each of the frames in the video subsequent to the second frame (e.g., the third frame, the fourth frame, the fifth frame, etc.) may be processed based on operations similar to the above description.

The operation for removing the feature points that are determined as corresponding to the moving object may reduce the operation amount, and improve the probability that the remaining feature points are distributed on the background (which may be determined as being static) of the current frame, which is more advantageous for performing motion compensation on the current frame. In addition, one or more new feature points (e.g., the second feature points) are added after the one or more first feature points are removed. The new added feature points together with the remaining first feature points may be tracked in the next frame, so that the number (or count) of feature points to be tracked may be kept within a certain range, and the problem that motion compensation cannot be performed to the video caused by too few feature points may be avoided. It is also not necessary to re-detect feature points when the number (or count) of feature points is too small, so a sudden change in the number (or count) of feature points and video stuttering may not occur.

FIG. 1 is a schematic diagram illustrating an exemplary imaging system 100 according to some embodiments of the present disclosure. In some embodiments, at least part of the imaging system 100 may be implemented with an electronic device that needs to capture images or videos, for example, a digital camera, a video camera, a smartphone, a monitoring device, or the like. As illustrated in FIG. 1, the imaging system 100 may include an image capture device 110, a processing device 120, a network 130, and a storage device 140.

The image capture device 110 may be configured to capture images or videos. The images or videos may be two-dimensional (2D) or three-dimensional (3D). In some embodiments, the image capture device 110 may include a digital camera. The digital camera may include a 2D camera, a 3D camera, a panoramic camera, a virtual reality (VR) camera, a web camera, an instant picture camera, a video camera, a surveillance camera, or the like, or any combination thereof. In some embodiments, the image capture device 110 may include a stereo camera. The stereo camera may include a binocular vision device or a multi-camera. In some embodiments, the image capture device 110 may be added to or be part of a medical imaging equipment, a night-vision equipment, a radar equipment, a sonar equipment, an electronic eye, a camcorder, a thermal imaging equipment, a smartphone, a tablet PC, a laptop, a wearable equipment (e.g., 3D glasses), an eye of a robot, a vehicle traveling data recorder, an unmanned device (e.g., a unmanned aerial vehicle (UAV), a driverless car, etc.), a video gaming console, or the like, or any combination thereof.

In some embodiments, the image capture device 110 may include one or more lenses, a sensor, an exposure-time controller, an amplifier, and an analog to digital (A/D) converter.

In some embodiments, the image capture device 110 may communicate with one or more components (e.g., the processing device 120, or the storage device 140) of the image capture device 110 via the network 130. In some embodiments, the image capture device 110 may be directly connected to the one or more components (e.g., the processing device 120, or the storage device 140) of the image capture device 110.

The processing device 120 may process information and/or data to perform one or more functions described in the present disclosure. For example, the processing device 120 may obtain a video captured by the image capture device 110 and perform video stabilization to the video.

In some embodiments, the processing device 120 may be a single server or a server group. The server group may be centralized, or distributed (e.g., the processing device 120 may be a distributed system). In some embodiments, the processing device 120 may be local or remote. For example, the processing device 120 may access/transmit information and/or data in/to the image capture device 110, or the storage device 140 via the network 130. As another example, the processing device 120 may be directly connected to the image capture device 110, or the storage device 140 to access/transmit information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented on a computing device 200 having one or more components illustrated in FIG. 2 in the present disclosure.

In some embodiments, the processing device 120 may be implemented on a mobile device, a tablet computer, a laptop computer, a built-in device in a motor vehicle, or the like, or any combination thereof. In some embodiments, the mobile device may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle may include an onboard computer, an onboard television, a traveling data recorder, etc. In some embodiments, the processing device 120 may be implemented on a mobile device 300 having one or more components illustrated in FIG. 3 in the present disclosure.

In some embodiments, the processing device 120 may include one or more processing engines (e.g., single-core processing engine(s) or multi-core processor(s)). Merely by way of example, the processing device 120 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof. In some embodiments, at least a part of the processing device 120 may be included in the image capture device 110.

The network 130 may be configured to facilitate communications among the components (e.g., the image capture device 110, the processing device 120, and the storage device 140) of the imaging system 100. For example, the network 130 may transmit digital signals from the image capture device 110 to the processing device 120. As another example, the network 130 may transmit images generated by the image capture device 110 to the storage device 140.

In some embodiments, the network 130 may include a wired network, a wireless network, or any connection capable of transmitting and receiving data. In some embodiments, the wired network may include a connection using a metal cable, an optical cable, a hybrid cable, or the like, or any combination thereof. In some embodiments, the wireless network may include a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof.

The storage device 140 may be configured to store data and/or instructions. In some embodiments, the storage device 140 may store data obtained from the processing device 120 and/or the image capture device 110. For example, the storage device 140 may store images generated by the processing device 120 and/or the image capture device 110. In some embodiments, the storage device 140 may store data and/or instructions that the processing device 120 may execute or use to perform exemplary methods described in the present disclosure. For example, the storage device 140 may store instructions that the processing device 120 may execute to perform video stabilization to a video captured by the image capture device 110. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 130 to communicate with one or more components in the imaging system 100 (e.g., the image capture device 110 and the processing device 120). One or more components in the imaging system 100 may access the data or instructions stored in the storage device 140 via the network 130. In some embodiments, the storage device 140 may be directly connected to or communicate with one or more components in the imaging system 100 (e.g., the image capture device 110 and the processing device 120). In some embodiments, the storage device 140 may be part of the image capture device 110 and/or the processing device 120.

In some embodiments, two or more components of the imaging system 100 may be integrated in one device. For example, the image capture device 110, the processing device 120, and the storage device 140 may be integrated in one device (e.g., a camera, a smartphone, a laptop, a workstation, a server, etc.). In some embodiments, one or more components of the imaging system 100 may be located remote from other components. For example, the image capture device 110 may be installed at a location away from the processing device 120, which may be implemented in a single device with the storage device 140.

It should be noted that the component of the imaging system 100 illustrated in FIG. 1 may be implemented via various ways. For example, the components may be implemented through hardware, software, or a combination thereof. Herein, the hardware may be implemented by a dedicated logic; the software may be stored in the storage, the system may be executed by proper instructions, for example, by a microprocessor or a dedicated design hardware. Those skilled in the art can understand that, the methods and systems described in this disclosure may be implemented by the executable instructions of a computer and/or by control code in the processor, for example, the code supplied in a carrier medium such as a disk, a CD, a DVD-ROM, in a programmable storage such as a read-only memory, or in a data carrier such as optical signal carrier or electric signal carrier. The systems and the methods in the present application may be implemented by a hardware circuit in a programmable hardware device in a ultra large scale integrated circuit, a gate array chip, a semiconductor such as a transistor, a field programmable gate array, a programmable logic device, a software performed by various processors, or a combination thereof (e.g., firmware).

Figure 2:
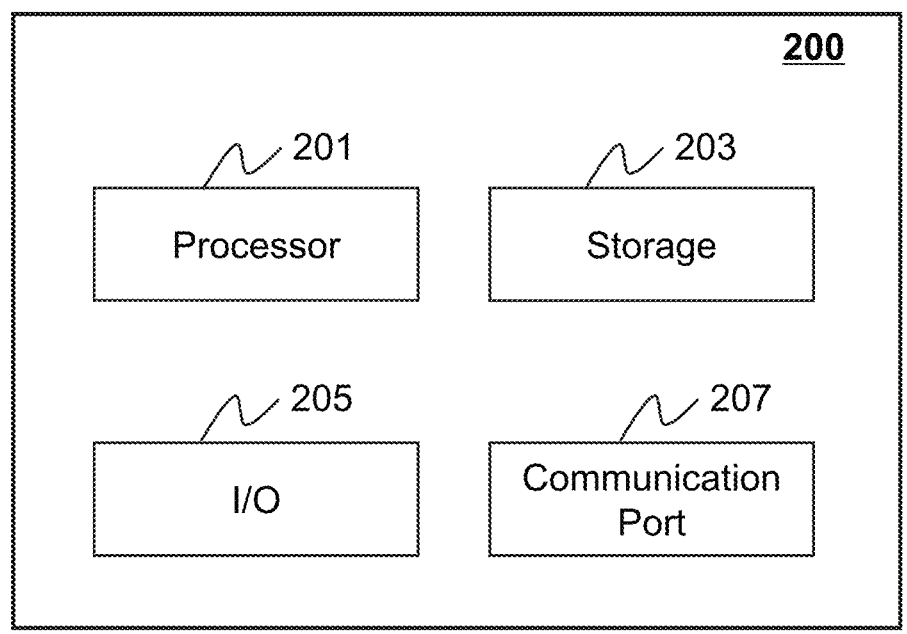
FIG. 2 is a schematic diagram illustrating exemplary hardware and software components of a computing device according to some embodiments of the present disclosure.

FIG. 2 is a schematic diagram illustrating exemplary hardware and/or software components of a computing device on which the image capture device 110 or the processing device 120 may be implemented according to some embodiments of the present disclosure. As illustrated in FIG. 2, the computing device 200 may include a processor 201, a storage 203, an input/output (I/O) 205, and a communication port 207.

The processor 201 may execute computer instructions (program code) and perform functions of the processing device in accordance with techniques described herein. The computer instructions may include routines, programs, objects, components, signals, data structures, procedures, modules, and functions, which perform particular functions described herein. For example, the processing device 120 may be implemented on the computing device 200 and the processor 201 may obtain a video captured by the image capture device 110 and perform video stabilization to the video. In some embodiments, the processor 201 may include a microcontroller, a microprocessor, a reduced instruction preset computer (RISC), an application specific integrated circuits (ASICs), an application-specific instruction-preset processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be note that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., a first processor executes step A and a second processor executes step B, or the first and second processors jointly execute steps A and B).

The storage 203 may store data/information obtained from any other component of the computing device 200

(e.g., the processor 201). In some embodiments, the storage 203 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc.

In some embodiments, the storage 203 may store one or more programs and/or instructions to perform exemplary methods described in the present disclosure. For example, the storage 203 may store a program for performing video stabilization to a video. As another example, the storage 203 may store images captured by the image capture device 110.

The I/O 205 may input or output signals, data, or information. In some embodiments, the I/O 205 may enable a user interaction with the processing device. For example, a captured image may be displayed through the I/O 205. In some embodiments, the I/O 205 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 207 may be connected to a network to facilitate data communications. The communication port 207 may establish connections between the computing device 200 (e.g., the capture device 100) and an external device (e.g., a smart phone). The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 207 may be a standardized communication port, such as RS232, RS485, etc.

Figure 3:
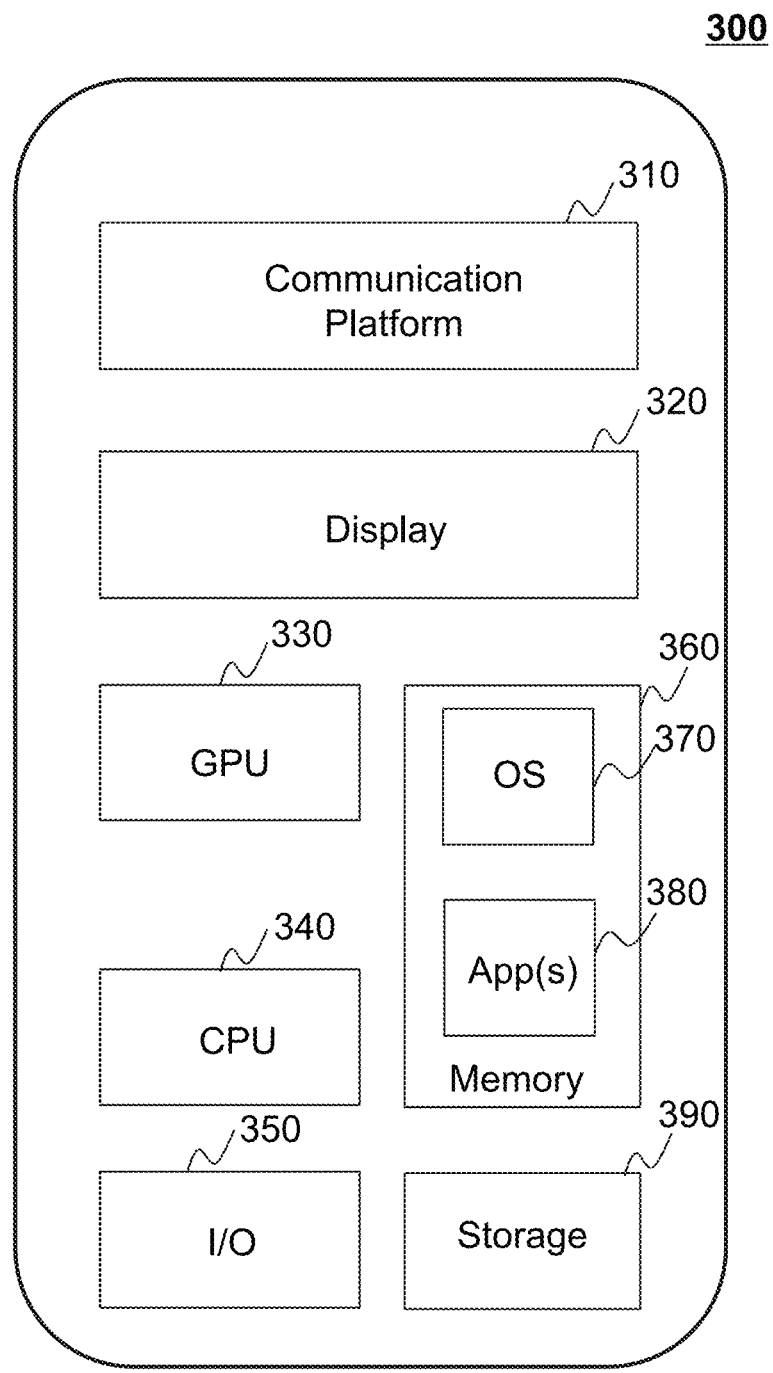
FIG. 3 is a schematic diagram illustrating exemplary hardware and software components of a mobile device according to some embodiments of the present disclosure.

FIG. 3 is a schematic diagram illustrating exemplary hardware and/or software components of a mobile device on which the image capture device 110 or the processing device 120 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing device 120. User interactions with the information stream may be achieved via the I/O 350 and provided to the processing device 120 and/or other components of the speed prediction system 100 via the network 130. Merely by way of example, a road feature transmit to a service requester may be displayed in the user terminal 140 through the display 320. As another example, a service provider may input an image related to a road segment through the I/O 350.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
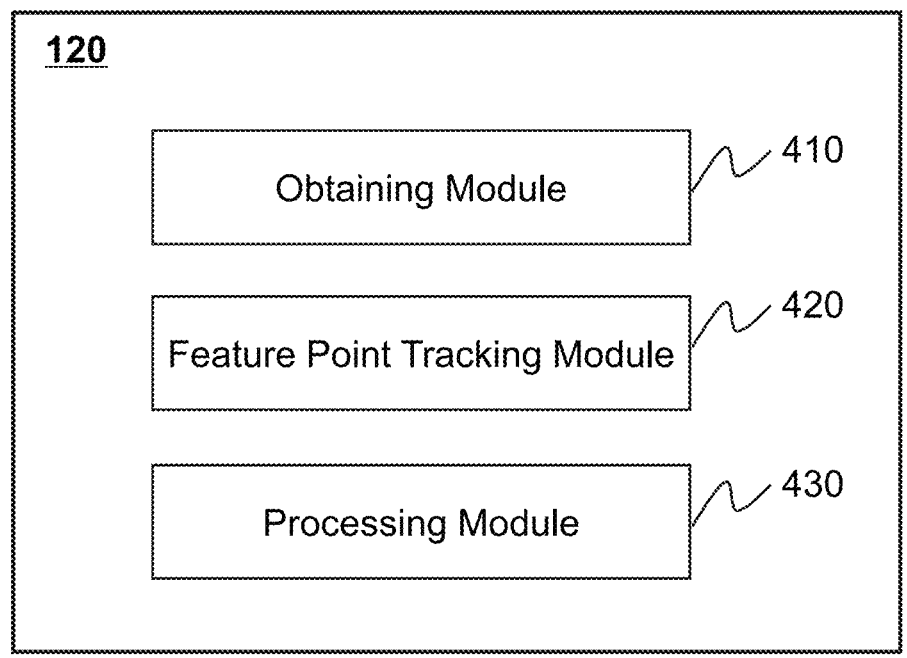
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 120 may include an obtaining module 410, a feature point tracking module 420, and a processing module 430.

The obtaining module 410 may obtain a target frame of a video. The video may include a plurality of consecutive frames. The target frame may be one of the plurality of consecutive frames and may be different from a first frame of the video. For example, for a process in real-time stabilizing a video that is being captured by the image capture device 110, the target frame (e.g., the current frame) may be the latest frame in the current video and may be different from the first frame of the video. As another example, for a process for stabilizing a video that has been completed, the target frame may be any one frame other than the first frame.

The feature point tracking module 420 may obtain a plurality of first feature points associated with the target frame. In some embodiments, the plurality of first feature points associated with the target frame may be the feature points used to perform video stabilization (e.g., motion compensation and/or correction) to the target frame, also referred to as the feature points to be tracked in the target frame. As used in the present disclosure, the feature point may be a pixel in a frame.

In some embodiments, the plurality of first feature points may be detected in one or more frames of the video prior to the target frame.

In some embodiments, if the target frame is the second frame of the video, the feature point tracking module 420 may determine a plurality of third feature points in the first frame by performing feature point detection to the first frame and designate the plurality of third feature points as the plurality of first feature points.

In some embodiments, the feature point tracking module 420 may perform the feature point detection based on a point detection algorithm of features from accelerated segment test (FAST), a feature point detection algorithm of Good Feature To Track, or the like, or any combination thereof. Specifically, the feature point tracking module 420 may perform the feature point detection to the first frame using the FAST algorithm to determine a specified number (or count) of feature points in the first frame. The present disclosure does not limit the feature point detection algorithm to determine the plurality of third feature points.

In some embodiments, the feature point tracking module 420 may determine a plurality of candidate feature points in the first frame. The feature point tracking module 420 may select a portion of the plurality of candidate feature points as the plurality of first feature points. In some embodiments, the feature point tracking module 420 may set that the selected portion of the plurality of candidate feature points may include a preset number (or count) of feature points, such as, 16, 20, etc. In some embodiments, the feature point tracking module 420 may set that the selected portion of the plurality of candidate feature points may be a preset percentage of the plurality of candidate feature points. For example, if the feature point tracking module 420 detects 50 candidate feature points in the first frame 601 in FIG. 6A, the feature point tracking module 420 may select 80% (the preset percentage) of the 50 first feature points, that is, 40 first feature points may be used as the feature points to be tracked in the second frame 602 in FIG. 6B. The preset number (or count) and/or the preset percentage may be set according to actual needs, and the present disclosure does not limit this.

In some embodiments, if the target frame is different from the second frame, the plurality of first feature points may include the feature points used to perform video stabilization to the frame of the video immediately prior to the target frame (also referred to as a previous frame). In some embodiments, the plurality of first feature points may further include one or more supplement feature points determined in the previous frame. Details related to the source of the plurality of first feature points may be found elsewhere in the present disclosure (e.g., description in connection with operation 570 and/or operation 590).

The processing module 430 may determine whether the plurality of first feature points include at least one feature point relating to a moving object in the video.

In some embodiments, the processing module 430 may identify the feature point related to the moving object in the plurality of first feature points by performing operations A1-A6 using the random sample consensus (RANSAC) algorithm.

In operation A1, the processing module 430 may determine current coordinates of each of the plurality of first feature points.

In operation A2, the processing module 430 may determine historical coordinates of each of the plurality of first feature points.

In operation A3, the processing module 430 may estimate one or more second motion parameters according to the current coordinates of the plurality of first feature points and the historical coordinates of the plurality of first feature points.

In operation A4, the processing module 430 may transform the current coordinates of the plurality of first feature points using the one or more second motion parameters.

In operation A5, for each of the plurality of first feature points, the processing module 430 may determine a difference between the historical coordinates and the transformed current coordinates of the first feature point.

In operation A6, for each of the plurality of first feature points, the processing module 430 may determine whether the difference is greater than a preset threshold. In response to a determination that the difference is greater than the preset threshold, the processing module 430 may designate the first feature point as the feature point relating to the moving object.

The processing module 430 may also remove the at least one feature point relating to the moving object.

The processing module 430 may also perform video stabilization (e.g., the final video stabilization) to the target frame based on remaining first feature points of the plurality of first feature points.

In some embodiments, the processing module 430 may estimate one or more first motion parameters based on the remaining first feature points. The processing module 430 may perform route planning or filtering to the target frame based on the one or more first motion parameters. The processing module 430 may perform video stabilization (e.g., correction) to the target frame by performing motion compensation to the target frame based on a result of the route planning or the filtering.

The processing module 430 may also determine, in the target frame, at least one supplement feature point that is different from the remaining first feature points.

The processing module 430 may also designate the at least one supplement feature point and the remaining first feature points as second feature points associated with a frame immediately following the target frame in the video.

The processing module 430 may also stabilize the target frame based on the plurality of first feature points.

The processing module 430 may also designate the plurality of first feature points as the second feature points associated with the frame immediately following the target frame in the video.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the processing module 430 may be divided into three units. A first unit may determine and remove the feature points relating to the moving object. A second unit may perform video stabilization to the target frame. A third unit may determine the one or more supplement feature points in the target frame.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 120 may further include a storage module (not shown in FIG. 4). The storage module may be configured to store data generated during any process performed by any component of in the processing device 120. As another example, each of components of the processing device 120 may correspond to a storage module, respectively. Additionally or alternatively, the components of the processing device 120 may share a common storage module.

Figure 5:
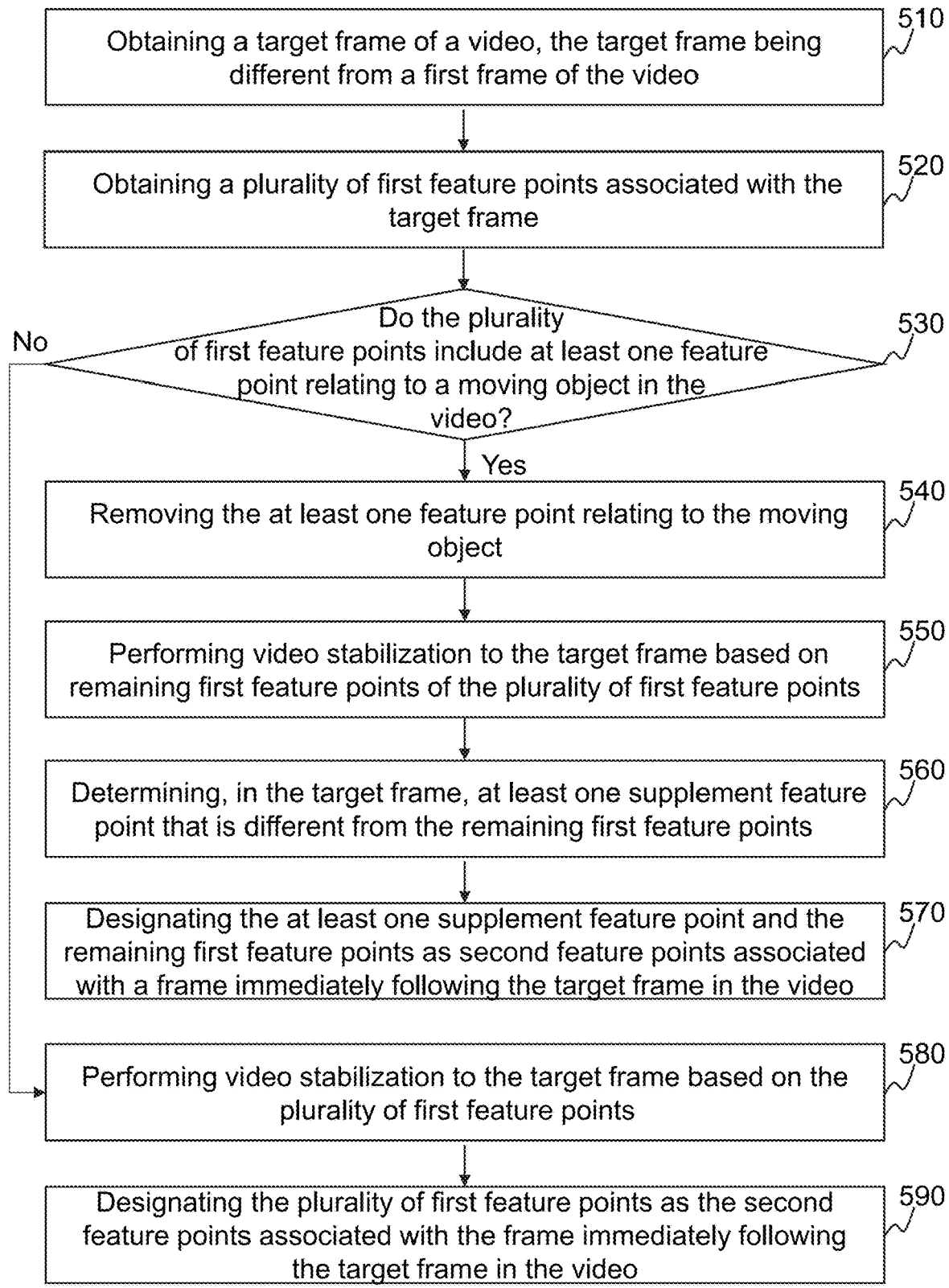
FIG. 5 is a flowchart illustrating an exemplary process for video stabilization according to some embodiments of the present disclosure.

FIG. 5 is a flowchart illustrating an exemplary process for video stabilization according to some embodiments of the present disclosure. In some embodiments, the process 500 may be implemented in the imaging system 100 illustrated in FIG. 1. For example, the process 500 may be stored in a storage medium (e.g., the storage device 140, the storage 203, the memory 360, or the storage 390) as a form of instructions, and can be invoked and/or executed by the processing device 120 (e.g., the processor 201, the CPU 340, or one or more modules in the processing device 120 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In some embodiments, the process 500 may be used to stabilize in real time a video that is being captured. For example, when the image capture device 110 is capturing a scene to generate a plurality of consecutive frames to form a video, from the second frame of the video, every time a new frame is generated, the processing device 120 may stabilize in real-time the new frame via the process 500.

In some embodiments, the process 500 may be used to stabilize a video that has been completed. For example, the processing device 120 may stabilize the video frame-by-frame from the second frame of the video by repeating the process 500.

In some embodiments, the process 500 may include the following operations: obtaining a target frame of a video, the target frame being different from a first frame of the video (operation 510); obtaining a plurality of first feature points associated with the target frame (operation 520); determining whether the plurality of first feature points include at least one feature point relating to a moving object in the video (operation 530); in response to a determination that the plurality of first feature points include at least one feature point relating to the moving object in the video, removing the at least one feature point relating to the moving object (operation 540); stabilize the target frame based on remaining first feature points of the plurality of first feature points (operation 550); determining, in the target frame, at least one supplement feature point that is different from the remaining first feature points (operation 560); and designating the at least one supplement feature point and the remaining first feature points as second feature points associated with a frame immediately following the target frame in the video (operation 570).

In 510, the processing device 120 (e.g., the obtaining module 410) may obtain a target frame of a video. The video may include a plurality of consecutive frames. The target frame may be one of the plurality of consecutive frames and may be different from a first frame of the video. For example, for a process in real-time stabilizing a video that is being captured by the image capture device 110, the target frame (e.g., the current frame) may be the latest frame in the current video and may be different from the first frame of the video. As another example, for a process for stabilizing a video that has been completed, the target frame may be any one frame other than the first frame.

In 520, the processing device 120 (e.g., the feature point tracking module 420) may obtain a plurality of first feature points associated with the target frame. In some embodiments, the plurality of first feature points associated with the target frame may be the feature points used to perform video stabilization (e.g., motion compensation and/or correction) to the target frame, also referred to as the feature points to be tracked in the target frame. As used in the present disclosure, the feature point may be a pixel in a frame.

In some embodiments, the plurality of first feature points may be detected in one or more frames of the video prior to the target frame.

In some embodiments, if the target frame is the second frame of the video, the processing device 120 may determine a plurality of third feature points in the first frame by performing feature point detection to the first frame and designate the plurality of third feature points as the plurality of first feature points.

In some embodiments, the processing device 120 may perform the feature point detection based on a point detection algorithm of features from accelerated segment test (FAST), a feature point detection algorithm of Good Feature To Track, or the like, or any combination thereof. Specifically, the processing device 120 may perform the feature point detection to the first frame using the FAST algorithm to determine a specified number (or count) of feature points in the first frame. The present disclosure does not limit the feature point detection algorithm to determine the plurality of third feature points.

In some embodiments, the processing device 120 may determine a plurality of candidate feature points in the first frame. The processing device 120 may select a portion of the plurality of candidate feature points as the plurality of first feature points. In some embodiments, the processing device 120 may set that the selected portion of the plurality of candidate feature points may include a preset number (or count) of feature points, such as, 16, 20, etc. In some embodiments, the processing device 120 may set that the selected portion of the plurality of candidate feature points may be a preset percentage of the plurality of candidate feature points. For example, if the processing device 120 detects 50 candidate feature points in the first frame 601 in FIG. 6A, the processing device 120 may select 80% (the preset percentage) of the 50 first feature points, that is, 40 first feature points may be used as the feature points to be tracked in the second frame 602 in FIG. 6B. The preset number (or count) and/or the preset percentage may be set according to actual needs, and the present disclosure does not limit this.

In some embodiments, if the target frame is different from the second frame, the plurality of first feature points may include the feature points used to perform video stabilization to the frame of the video immediately prior to the target frame (also referred to as a previous frame). In some embodiments, the plurality of first feature points may further include one or more supplement feature points determined in the previous frame. Details related to the source of the plurality of first feature points may be found elsewhere in the present disclosure (e.g., description in connection with operation 570 and/or operation 590).

In 530, the processing device 120 (e.g., the processing module 430) may determine whether the plurality of first feature points include at least one feature point relating to a moving object in the video. In response to a determination that the plurality of first feature points include at least one feature point relating to a moving object in the video, the processing device 120 may perform operations 540-570. In response to a determination that the plurality of first feature points include no feature point relating to a moving object in the video, the processing device 120 may perform operations 580-590.

In some embodiments, the processing device 120 may identify the feature point related to the moving object in the plurality of first feature points by performing operations A1-A6 using the random sample consensus (RANSAC) algorithm.

In operation A1, the processing device 120 may determine current coordinates of each of the plurality of first feature points. The current coordinates of the first feature points may refer to the coordinates of the first feature point's corresponding feature point in the target frame. The first feature point and its corresponding feature point in the target frame may correspond to the same feature of the same object in the video.

In some embodiments, a frame may include pixels arranged in rows and columns. As used in the present disclosure, the coordinates of a feature point (e.g., a pixel) in a frame may include a first coordinate along the row direction of the frame (also referred to as the x coordinate) and a second coordinate along the column direction of the frame (also referred to as the y coordinate).

In operation A2, the processing device 120 may obtain historical coordinates of each of the plurality of first feature points. The historical coordinates of the first feature point may refer to the coordinates of the first feature point in a source frame that has been transformed based on first motion parameters or second motion parameters corresponding to the source frame. Each of the plurality of first feature points may correspond to a source frame. The first feature point may be determined in its corresponding source frame.

For example, if the target frame is the second frame of the video, the plurality of first feature points may be determined in the first frame of the video, and the first frame may be the source frame of the plurality of first feature points. As another example, if the target frame is the third frame of the video, and the plurality of first feature points include a first set of feature points determined in the first frame and a second set of feature points determined in the second frame, the first frame may be the source frame of the first set of feature points and the second frame may be source frame of the second set of feature points.

In operation A3, the processing device 120 may estimate one or more second motion parameters according to the current coordinates of the plurality of first feature points and the historical coordinates of the plurality of first feature points.

In operation A4, the processing device 120 may transform the current coordinates of the plurality of first feature points using the one or more second motion parameters.

In operation A5, for each of the plurality of first feature points, the processing device 120 may determine a difference between the historical coordinates and the transformed current coordinates of the first feature point.

In operation A6, for each of the plurality of first feature points, the processing device 120 may determine whether the difference is greater than a preset threshold. In response to a determination that the difference is greater than the preset threshold, the processing device 120 may designate the first feature point as the feature point relating to the moving object.

In some embodiments, if the current coordinates of the plurality of first feature points are compared with the coordinates of the corresponding feature points in the previous frame, it may be difficult for the processing device 120 to determine whether the first feature point relates to a moving object because the displacement of the moving object during a period of time between the previous frame and the target frame may be small. Therefore, in operations A1-A6, the processing device 120 may compare the current coordinates and the historical coordinates of the plurality of first feature points, which may improve the accuracy of identifying the feature point relating to the moving object.

In some embodiments, when the processing device 120 identifies one or more feature points related to the moving object in the plurality of first feature points, the target frame has not been corrected by video stabilization. The current coordinates of the plurality of first feature points may be affected by the camera's shake. If the processing device 120 directly uses the current coordinates of the plurality of first feature points to identify the feature point related to the moving object, the identification result may be inaccurate. Therefore, the processing device 120 may estimate one or more second motion parameters based on the current coordinates and the historical coordinates of the plurality of first feature points. The processing device 120 may transform the current coordinates of the plurality of first feature points using the one or more second motion parameters. The processing device 120 may identify the feature point related to the moving object by comparing the historical coordinates and the transformed current coordinates of the plurality of first feature points.

In some embodiments, the one or more second motion parameters may include a homography matrix. The operation for transforming the current coordinates of the plurality of first feature points using the one or more second motion parameters may be regarded as an operation for performing preliminary video stabilization (e.g., correction) to the current coordinates of the plurality of first feature points.

Merely by way of example, the one or more estimated second motion parameters may include a homography matrix that may be represented by Equation (1) below:

$$H = \begin{bmatrix} a & b & c \\ d & e & f \\ g & h & l \end{bmatrix}. \qquad (1)$$

The current coordinates of the first feature point X may be $X_1=(x_1, y_1)$, and the historical coordinates of the first feature point X may be $X_0=(x_0, y_0)$.

The processing device 120 may transform the current coordinates of the first feature point X according to Equation (1) and Equations (2)-(5):

$$X_1'=H*X_1 \qquad (2),$$

$$X_1'=(x_1', y_1') \qquad (3),$$

$$x_1'=(a*x_1+b*y_1+c)/(g*x_1+h*y_1+l) \qquad (4),$$

and $$y_1'=(d*x_1+e*y_1+f)/(g*x_1+h*y_1+l) \qquad (5),$$

wherein $X_1'=(x_1', y_1')$ refers to the transformed current coordinates of the first feature point X.

The processing device 120 may determine the distance between the transformed current coordinates and the historical coordinates of the first feature point X based on Equation (6) below:

$$D=|X_0-X_1'| \qquad (6),$$

wherein D refers to the difference between the transformed current coordinates and the historical coordinates of the first feature point X.

In some embodiments, the processing device 120 may identify the feature point related to the moving object based on an iteration process including a plurality of iterations. Each of the plurality of iterations may include operations A4-A6. For example, in each of the plurality of iterations, the processing device 120 may remove the first feature point that is determined relating to the moving object, and the processing device 120 may perform, using the one or more second motion parameters, transformation to the transformed current coordinates of the remaining first feature points that are determined in the previous iteration.

In some embodiments, the preset threshold may be set as needed, for example, may be set to 3, 5, or the like. In some embodiments, by performing operations A1-A6, the distance exceeding the preset threshold may be determined as being caused by the movement of the object corresponding to the first feature point, rather than the camera's shake. Therefore, if the distance exceeds the preset threshold, the first feature point may be determined as the feature point related to the moving object. The process including operations A1-A6 may remove the feature points related to the moving object, and may lead to a result that the remaining first feature points are the feature points that distribute on the background of the target frame, which may be beneficial to perform video stabilization and/or motion compensation to the target frame.

In 540, the processing device 120 (e.g., the processing module 430) may remove the at least one feature point relating to the moving object.

In 550, the processing device 120 (e.g., the processing module 430) may perform video stabilization (e.g., the final video stabilization) to the target frame based on remaining first feature points of the plurality of first feature points.

In some embodiments, the processing device 120 may estimate one or more first motion parameters based on the remaining first feature points. The processing device 120 may perform route planning or filtering to the target frame based on the one or more first motion parameters. The processing device 120 may perform video stabilization (e.g., correction) to the target frame by performing motion compensation to the target frame based on a result of the route planning or the filtering.

In some embodiments, the route planning may include an optimization process. The filtering may include route Gaussian filtering. The process for route planning and filtering is not limited in the present disclosure.

In some embodiments, the processing device 120 may obtain the current coordinates of the remaining first feature points. The processing device 120 may obtain correction coordinates of the remaining first feature points. In some embodiments, if the target frame is the second frame of the video, the correction coordinates of the remaining first feature points may refer to the coordinates of the remaining first feature points' corresponding feature points in the first frame of the video. In some embodiments, if the target frame is different from the second frame of the video, the correction coordinates of the remaining first feature points may refer to the coordinates of the remaining first feature points' corresponding feature points in the previous frame that has been corrected by video stabilization. The processing device 120 may estimate the one or more first motion parameters based on the current coordinates and the correction coordinates of the remaining first feature points. In some embodiments, the one or more first motion parameters may include a homography matrix. That is, the processing device 120 may estimate a homography matrix based on the current coordinates and the correction coordinates of the remaining first feature points.

In 560, the processing device 120 (e.g., the processing module 430) may determine, in the target frame, at least one supplement feature point that is different from the remaining first feature points.

In 570, the processing device 120 (e.g., the processing module 430) may designate the at least one supplement feature point and the remaining first feature points as second feature points associated with a frame immediately following the target frame in the video.

In some embodiments, in order to keep the number (or count) of the feature points to be tracked in each frame of the video within a certain range, the processing device 120 may determine one or more supplement feature points. For example, the number (or count) of the feature points to be tracked in each frame of the video may be kept consistent. As another example, for the frames of the video, a difference between the maximum number (or count) of the feature points to be tracked and the minimum number (or count) of the feature points to be tracked may be less than a difference threshold.

In some embodiments, the processing device 120 may determine a plurality of candidate feature points in the corrected target frame by performing feature point detection to the corrected target frame that is processed based on the one or more first motion parameters or the one or more second motion parameters. The processing device 120 may randomly select at least one of the plurality of candidate feature points. The count of the at least one selected candidate feature point may be equal to the count of the one or more removed first feature points. The processing device 120 may designate the at least one selected candidate feature point as the at least one supplement feature point.

In some embodiments, the processing device 120 may randomly determine at least one feature point with the same count as the count of the one or more removed first feature points in the corrected target frame that is processed based on the one or more first motion parameters or the one or more second motion parameters. The processing device 120 may designate the at least one feature point as the at least one supplement feature point.

In some embodiments, the number (or count) of the at least one supplement feature points may be the same as the number (or count) of the one or more removed first feature points, so that the number (or count) of the feature points used to perform video stabilization to each frame of the video may be consistent, which may avoids a sudden change of the feature points caused by feature point re-detection due to the reduction of the feature points, thereby avoiding video stuttering.

In 580, the processing device 120 (e.g., the processing module 430) may stabilize the video in the target frame based on the plurality of first feature points. In some embodiments, the processing device 120 may stabilize the target frame based on the plurality of first feature points by performing an operation similar to the description in operation 550.

In 590, the processing device 120 (e.g., the processing module 430) may designate the plurality of first feature points as the second feature points associated with the frame immediately following the target frame in the video.

In one embodiment, the processing device 120 may create a data group configured to store the historical coordinates of feature points to be tracked in the target frame. In some embodiments, when the processing device 120 removes the one or more first feature points relating to the moving object, the processing device 120 may remove the one or more first feature points relating to the moving object from the data group. In some embodiments, after correcting the target frame, the processing device 120 may determine one or more supplement feature points in the correct target frame and add the coordinates of the one or more supplement feature points in the correct target frame to the data group. Alternatively, the processing device 120 may transform the coordinates of the one or more supplement feature points in the correct target frame (or the target frame before correction) using the one or more second motion parameters and add the transformed coordinates of the one or more supplement feature points to the data group. In some embodiments, the historical coordinates may be the coordinates of the feature points stored in the data group.

For example, the processing device 120 may determine 50 first feature points such as $a_1$-$a_{50}$ in the first frame as the feature points to be tracked in the second frame. The processing device 120 may store the historical coordinates of $a_1$-$a_{50}$ in the data group. The historical coordinates of $a_1$-$a_{50}$ may be the coordiants of $a_1$-$a_{50}$ in the first frame. The processing device 120 may remove $a_{41}$-$a_{50}$. The processing device 120 may determine the one or more first motion parameters based on $a_1$-$a_{40}$. The processing device 120 may correct the second frame based on the one or more first motion parameters. The processing device 120 may determine supplement feature points $a_{51}$-$a_{60}$ in the second frame. The processing device 120 may add the historical coordinates of $a_{51}$-$a_{60}$ to the data group. The historical coordinates of $a_{51}$-$a_{60}$ may be the coordinates of $a_{51}$-$a_{60}$ in the corrected second frame, or the transformed coordinates of $a_{51}$-$a_{60}$ processed using the one or more second motion parameters. The processing device 120 may designate $a_1$-$a_{40}$ and $a_{51}$-$a_{60}$ as the feature points to be tracked in the third frame.

When the third frame is determined as the target frame, for the third frame, the historical coordinates of $a_1$-$a_{40}$ may be the coordinates of $a_1$-$a_{40}$ in the first frame, and the historical coordinates of $a_{51}$-$a_{60}$ may be the coordinates of $a_{51}$-$a_{60}$ in the corrected second frame, or the transformed coordinates of $a_{51}$-$a_{60}$ processed using the one or more second motion parameters. When the supplement feature point corresponds to the removed feature point, the historical coordinates of the supplement feature point may be re-determined based on the target frame, instead of using the coordinates of the removed feature point. For example, if the supplement feature points $a_{51}$-$a_{55}$ correspond to the removed feature points $a_{41}$-$a_{45}$, the historical coordinates of $a_{51}$-$a_{55}$ may be the coordinates of $a_{51}$-$a_{55}$ transformed by the one or more first motion parameters or the one or more second motion parameters, instead of the coordinates of $a_{41}$-$a_{45}$ in the first frame.

In the embodiment of the process 500, the feature points related to the moving object may be removed. The motion compensation may not be needed to be performed to the target frame using the global feature points (e.g., all detected feature points), which may reduce the operation amount. The feature points to be tracked may be distributed on the background, which is more conducive to motion compensation of the video. In addition, since one or more new feature points are added after one or more feature points re removed, the number (or count) of the feature points to be tracked may be kept within a certain range and may not continue to decrease. Therefore, there is no need to re-detect feature points when the number (or count) of the feature points to be tracked is reduced to a certain threshold, and video stuttering may be avoided.

Figure 6A:
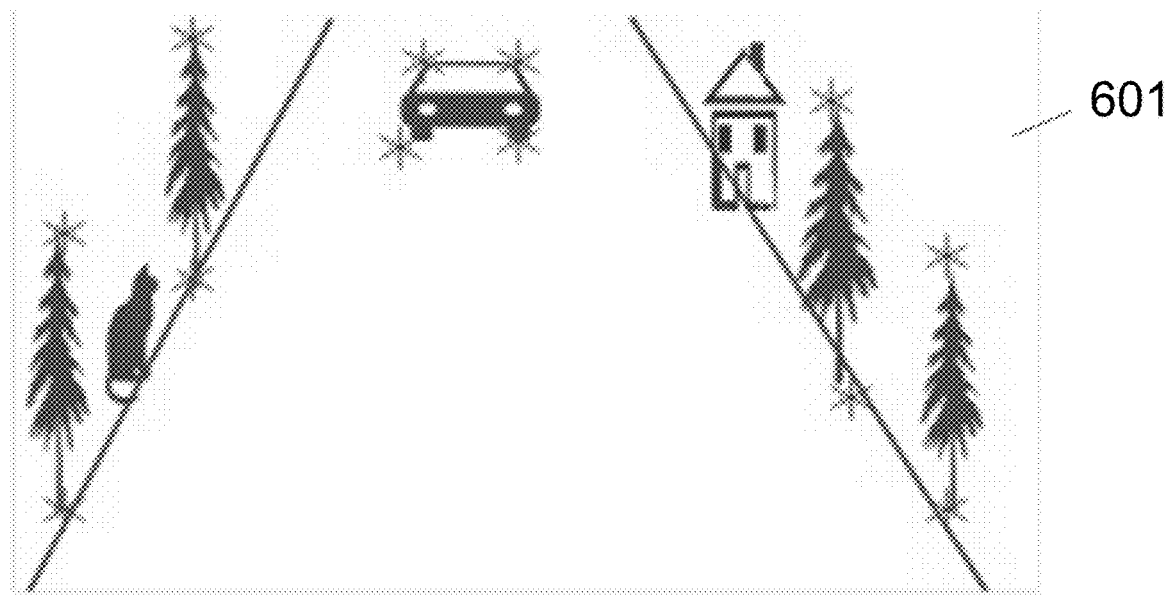
FIGS. 6A-6B are schematic diagrams illustrating examples of a first frame and a second frame of a video, respectively, according to some embodiments of the present disclosure.
Figure 6B:
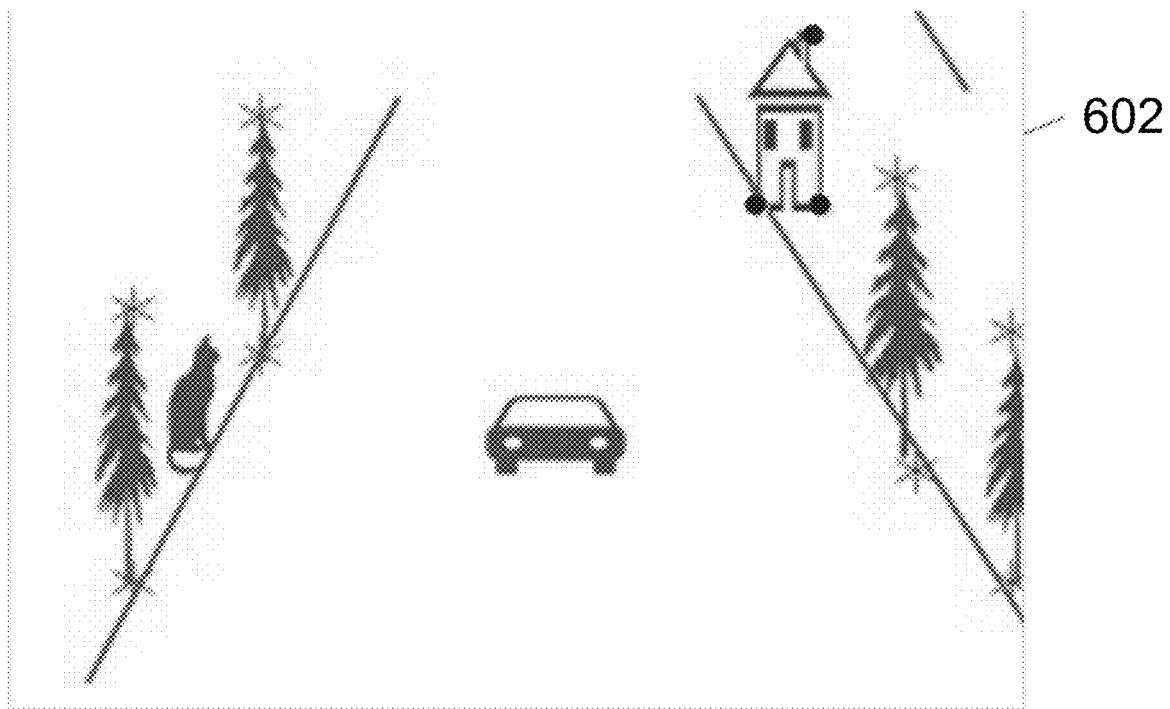

FIGS. 6A-6B are schematic diagrams illustrating examples of a first frame 601 and a second frame 602 of a video, respectively, according to some embodiments of the present disclosure. The first frame 601 and/or the second frame 602 may be processed based on the process 500 for video stabilization.

Merely by way of example, the second frame 602 may be the target frame. The processing device 120 may obtain the first frame 601. The processing device 120 may perform feature point detection to the first frame 601 to determine 12 first feature points (e.g., including the feature points marked by star signs in FIG. 6A) to be tracked in the second frame 602.

The processing device 120 may remove the first feature points relating to a moving object in the video (e.g., the 4 first feature points corresponding to the vehicle in the video) from the 12 first feature points. The processing device 120 may estimate the one or more first motion parameters based on the remaining 8 first feature points. The processing device 120 may perform the route planning or filtering to the second frame 602 according to the one or more first motion parameters. The processing device 120 may perform video stabilization to the second frame 602 by performing motion compensation to the second frame 602.

The processing device 120 may determine 3 supplement feature points (e.g., the feature points marked with solid circles in FIG. 6B) in the second frame 602. The processing device 120 may designate the 3 supplement feature points and the remaining 8 first feature points as feature points to be tracked in the third frame of the video. The 3 supplement feature points in the second frame 602 may be different from the remaining 8 first feature points.

In some embodiments, if the processing device 120 determines that the 12 first feature points include no feature point relating to the moving object, the processing device 120 may perform video stabilization to the second frame 602 based on the 12 first feature points. The processing device 120 may designate the 12 first feature points as the feature points to be tracked in the third frame of the video.

When the processing device 120 does not remove any one of the feature points to be tracked in the target frame, the feature points to be tracked in the target frame may still be used as the feature points to be tracked in the frame immediately following the target frame, which may ensure that the number (or count) of feature points to be tracked does not change, thereby avoiding the increase of the operation amount and the video stuttering.

Figure 7A:
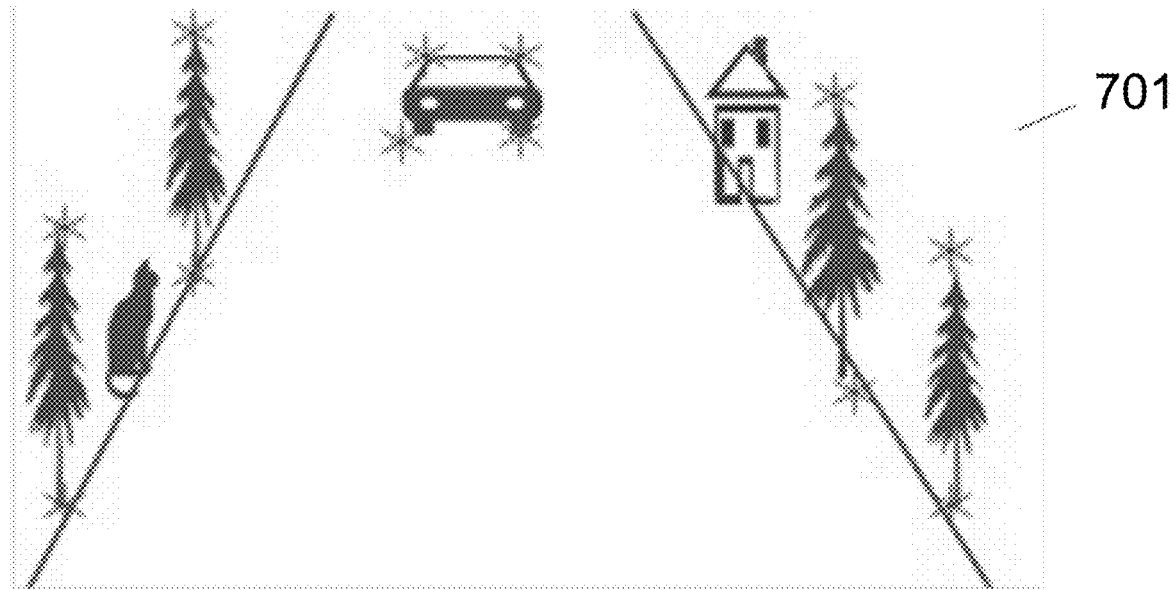
FIGS. 7A-7C are schematic diagrams illustrating examples of a first frame, a second frame, and a third frame of a video, respectively, according to some embodiments of the present disclosure.
Figure 7B:
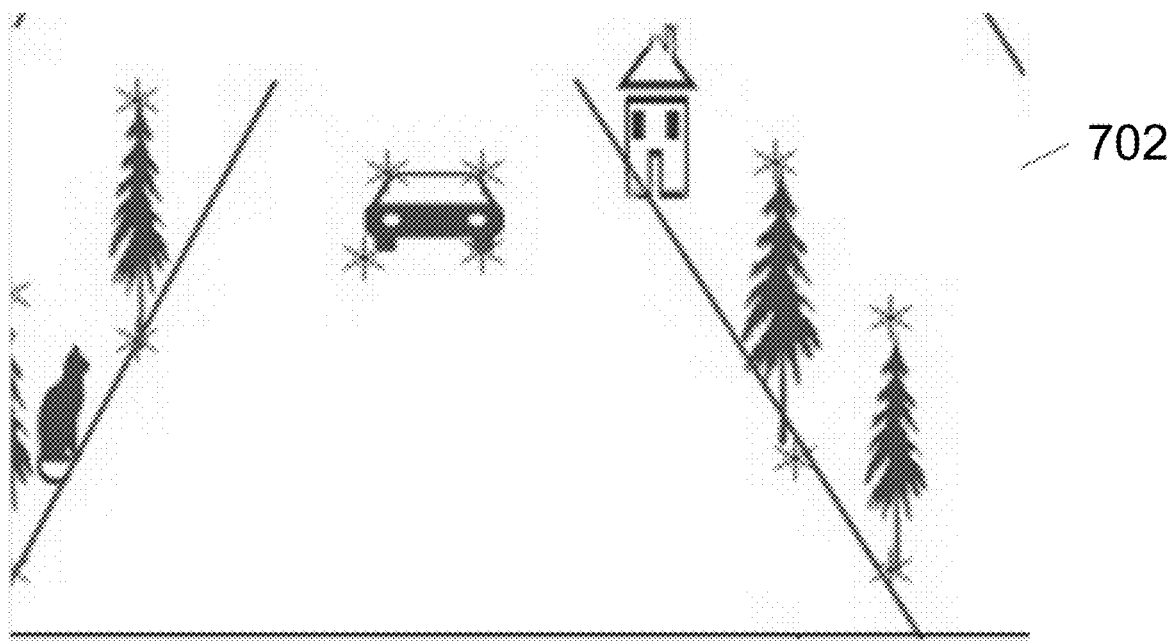
Figure 7C:
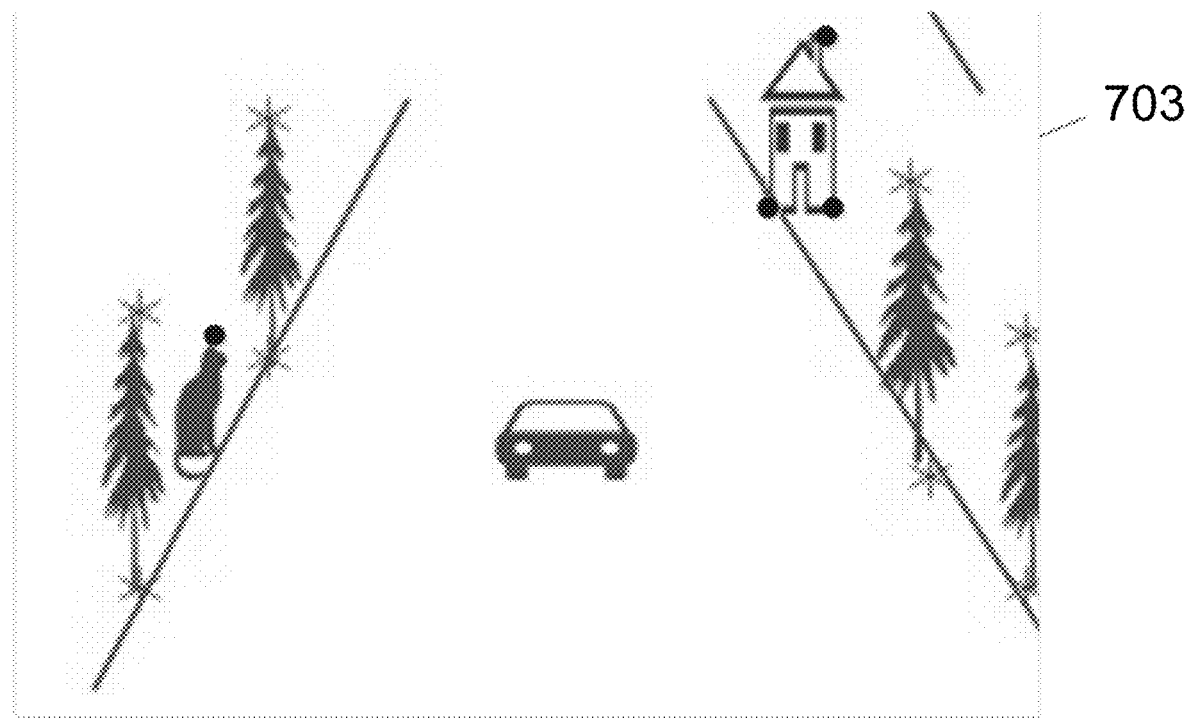

FIGS. 7A-7C are schematic diagrams illustrating examples of a first frame 701, a second frame 702, and a third frame 703 of a video, respectively, according to some embodiments of the present disclosure. The first frame 701, the second frame 702, and/or the third frame 703 may be processed based on the process 500 for video stabilization.

Merely by way of example, the processing device 120 may perform feature point detection to the first frame 701 using the feature point detection algorithm of FAST, and determine 16 candidate feature points in the first frame 701. The processing device 120 may select 12 of the 16 candidate feature points as the first feature points (e.g., the feature points marked with star signs in FIG. 7A) to be tracked in the second frame 702. The processing device 120 may track the 12 first feature points using the KLT optical flow tracking algorithm.

The second frame 702 may be determined as the target frame. Since the displacement of the vehicle may be relatively small during a period of time between the first frame 701 and the second frame 702, none of the 12 first feature points corresponding to the vehicle maybe identified as the feature point relating to the moving object. The processing device 120 thus may not remove any one of the 12 first feature points. The processing device 120 may stabilize the video in the second frame 702 based on these 12 first feature points, and may determine these 12 first feature points as the feature points to be tracked in the third frame 703.

Then, the third frame 703 may be determined as the target frame. The four feature points corresponding to the vehicle may be determined as the feature points relating to the moving object. The processing device 120 may remove the 4 first feature points corresponding to the vehicle from the 12 first feature points. The processing device 120 may estimate the one or more first motion parameters based on the remaining 8 first feature points. The processing device 120 may perform the Gaussian filtering to the third frame 703 according to the one or more first motion parameters. The processing device 120 may stabilize the third frame 703 by performing motion compensation to the third frame 703.

The processing device 120 may randomly determine four supplement feature points (e.g., the feature points marked with solid circles in FIG. 7C) in the third frame 703. The processing device 120 may designate the four supplement feature points and the remaining 8 first feature points are randomly selected, a total of 12 feature points, as the feature points to be tracked in the fourth frame of the video.

In some embodiments, the systems and/or the methods for video stabilization provided by the present disclosure may improve the probability that the feature points used to perform video stabilization are distributed on the background of the target frame, which may be more advantageous for performing motion compensation to the target frame.

Suppose that the probability that a feature point is not removed is p. The processing device 120 may perform feature point detection to the first frame to determine and track the first feature points. For the second frame, in the first feature points, the number (or count) of outliers (e.g., the feature points relating to the moving object) is $a_0$, and the number (or count) of the feature points that are not related to the moving object is $b_0$. From the $n^{th}$ frame, in the feature points to be tracked in the $n^{th}$ frame, the ratio of the outliers to the feature points to be tracked in the $n^{th}$ frame is an, and the ratio of the feature points that are not related to the moving object to the feature points to be tracked in the $n^{th}$ frame is $b_n$. The feature points to be tracked in the $n^{th}$ frame may include the feature points to be tracked in the $(n-1)^{th}$ frame excluding the feature points relating to the moving object and the supplement feature points determined in the $(n-1)^{th}$ frame. $a_n$ may be determined based on Equation (7) below:

$$a_n = a_{n-1}(1-p) + a_{n-1}*p*0.5 + b_{n-1}*(1-p)*0.5 \qquad (7),$$

wherein $a_{n-1}(1-p)$ indicates the probability that the feature point related to the moving object in the $(n-1)^{th}$ frame is removed; $a_{n-1}*p*0.5$ indicates the probability that the feature point removed in the $n^{th}$ frame is re-selected as the feature point to be tracked; $b_{n-1}*(1-p)*0.5$ indicates that the probability that the removed feature point is not related to the moving object and the supplement feature point is the outlier.

In the $(n-1)^{th}$ frame, $a_{n-1}+b_{n-1}=1$, so Equation (7) may be transformed as Equation (8) below:

$$a_n = \frac{a_{n-1}}{2} + \frac{(1-p)}{2} \qquad (8)$$

Equation (9) below may be obtained by transforming Equation (8):

$$a_n = \frac{a_0}{2} + (1-p)\left(\frac{1}{2} + \frac{1}{2^2} + L + \frac{1}{2^n}\right) \qquad (9)$$

Equation (10) below may be obtained by determining the limit of Equation (9):

$$\lim_{n\to\infty} a_n = (1-p) \qquad (10)$$

That is to say, after several frames, the ratio of the outliers to the feature points to be tracked in the target frame may converge to 1−p. The simulation test results show that the rate of convergence of Equation (10) is very fast, usually after 10 frames, p=0.95. At this time, the ratio of the outliers to the feature points to be tracked in the target frame is 0.05. That is, the feature points to be tracked in the target frame may be converted to the background after about 10 frames. If the background of the video is unchanged, the feature points to be tracked in the target frame may be almost converged and does not change, which may improve the accuracy of estimating the one or more first motion parameters.

By using the methods and/or the systems for video stabilization provided in the present disclosure, in the target frame, the feature points determined as relating to the moving object may be removed. The target frame may be corrected based on the remaining feature points. After the correction, at least one supplement feature point may be determined in the target frame. The remaining feature points and the at least one supplement feature point may be designated as the feature points to be tracked in the frame immediately following the target frame. The methods and/or the systems for video stabilization provided in the present disclosure may make the feature points to be tracked gradually distribute on the background of the video, which may facilitate motion compensation for the video. Since the number (or count) of the feature points to be tracked does not change, video stuttering may be avoided.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather,

What is claimed is:

1. A system for video stabilization, comprising:
   at least one storage device storing a set of instructions; and
   at least one processor in communication with the at least one storage device, wherein when executing the set of instructions, the at least one processor is configured to stabilize a video frame-by-frame from a second frame of the video by repeating operations including:
      obtaining a target frame of the video, the target frame being a current frame to be stabilized in the video;
      obtaining a plurality of feature points to be tracked in the target frame;
      determining whether the plurality of feature points to be tracked in the target frame include at least one feature point relating to a moving object in the video;
      in response to a determination that the plurality of feature points to be tracked in the target frame include at least one feature point relating to the moving object in the video, removing the at least one feature point relating to the moving object;
      estimating one or more first motion parameters based on the remaining feature points of the plurality of feature points to be tracked in the target frame, the one or more first motion parameters including a homography matrix;
      performing video stabilization to the target frame based on the one or more first motion parameters;
      determining whether the target frame is a last frame of the video;
      in response to determining that the target frame is the last frame of the video, terminating the video stabilization;
      in response to determining that the target frame is not the last frame of the video,
         identifying, in the target frame after the video stabilization, at least one supplement feature point that is different from the remaining feature points of the plurality of feature points to be tracked in the target frame;
         designating the at least one supplement feature point and the remaining feature points as a plurality of feature points to be tracked in a frame immediately following the target frame in the video, a count of the at least one supplement feature point being equal to a count of at least one removed feature point so that a count the plurality of feature points to be tracked in the target frame is equal to a count of the plurality of feature points to be tracked in the frame immediately following the target frame; and
         initiating a new repetition of the operations.

2. The system of claim 1, wherein to perform the video stabilization to the target frame based on the one or more first motion parameters, the at least one processor is configured to perform operations including:
   performing video stabilization to the target frame by performing route planning or filtering based on the one or more first motion parameters.

3. The system of claim 1, wherein to estimate the one or more first motion parameters based on the remaining feature points, the at least one processor is configured to perform operations including:
   obtaining current coordinates of the remaining feature points in the target frame;
   obtaining prior coordinates of the remaining feature points in a frame prior to the target frame in the video;
   comparing the current coordinates and the prior coordinates; and
   estimating the one or more first motion parameters based on a comparison result.

4. The system of claim 1, wherein when executing the set of instructions, the at least one processor configured to perform operations further including:
   determining whether the target frame is the second frame of the video.

5. The system of claim 4, wherein the target frame is the second frame of the video; and
   wherein to obtain the plurality of feature points to be tracked in the target frame, the at least one processor is configured to perform operations including:
      obtaining the first frame of the video that is prior to the target frame;
      determining a plurality of third feature points in the first frame; and
      designating the plurality of third feature points as the plurality of feature points to be tracked in the target frame.

6. The system of claim 1, wherein to determine whether the plurality of feature points to be tracked in the target frame include at least one feature point relating to the moving object in the video, the at least one processor is configured to perform operations including:
   determining current coordinates of the plurality of feature points in the target frame;
   obtaining historical coordinates of the plurality of feature points in a source frame, the plurality of feature points being determined in the source frame;
   estimating one or more second motion parameters based on the current coordinates and the historical coordinates of the plurality of feature points to be tracked in the target frame;
   transforming the current coordinates of the plurality of feature points based on the one or more second motion parameters;
   for each of the plurality of feature points to be tracked in the target frame,
      determining a difference between the historical coordinates and the transformed current coordinates of the feature point;
      determining whether the difference is greater than a preset threshold; and
      in response to a determination that the difference is greater than the preset threshold, designating the feature point as the feature point relating to the moving object.

7. The system of claim 6, wherein the historical coordinates of the plurality of feature points in the source frame include coordinates that are transformed based on one or more third motion parameters associated with the source frame.

8. The system of claim 6, wherein when executing the set of instructions, the at least one processor is configured to perform operations including:
   creating a data group configured to store the historical coordinates of the plurality of feature points;
   wherein to remove the at least one feature point relating to the moving object, the at least one processor is configured to perform operations including:
      removing the historical coordinates of the at least one feature point relating to the moving object from the data group; and wherein to designate the at least one supplement feature point and the remaining feature points as the plurality of feature points to be tracked in the frame immediately following the target frame in the video, the at least one processor is configured to perform operations including:

adding historical coordinates of the at least one supplement feature point to the data group, wherein the historical coordinates of the at least one supplement feature point include coordinates that are transformed based on one or more fourth motion parameters associated with the target frame.

9. The system of claim 1, wherein to determine, in the target frame after the video stabilization, the at least one supplement feature point that is different from the remaining feature points of the plurality of feature points to be tracked in the target frame, the at least one processor is configured to perform operations including:

determining a plurality of candidate feature points in the target frame; and randomly selecting at least one of the plurality of candidate feature points as the at least one supplement feature point.

10. The system of claim 1, wherein when executing the set of instructions, the at least one processor is configured to perform operations including:

in response to a determination that the plurality of feature points to be tracked in the target frame include no feature point relating to the moving object in the video, performing video stabilization to the target frame based on the plurality of feature points; and designating the plurality of feature points as the plurality of feature points to be tracked in the frame immediately following the target frame in the video.

11. A method for video stabilization implemented on a machine having one or more storage devices and one or more processors, the method is configured to stabilize a video frame-by-frame from a second frame of the video by repeating operations including:

obtaining a target frame of the video, the target frame being a current frame to be stabilized in the video;

obtaining a plurality of feature points to be tracked in the target frame;

determining whether the plurality of feature points to be tracked in the target frame include at least one feature point relating to a moving object in the video;

in response to a determination that the plurality of feature points to be tracked in the target frame include at least one feature point relating to the moving object in the video, removing the at least one feature point relating to the moving object;

estimating one or more first motion parameters based on the remaining feature points of the plurality of feature points to be tracked in the target frame, the one or more first motion parameters including a homography matrix;

performing video stabilization to the target frame based on the one or more first motion parameters;

determining whether the target frame is a last frame of the video;

in response to determining that the target frame is the last frame of the video, terminating the video stabilization;

in response to determining that the target frame is not the last frame of the video, identifying, in the target frame after the video stabilization, at least one supplement feature point that is different from the remaining feature points of the plurality of feature points to be tracked in the target frame;

designating the at least one supplement feature point and the remaining feature points as a plurality of feature points to be tracked in a frame immediately following the target frame in the video, a count of the at least one supplement feature point being equal to a count of at least one removed feature point so that a count the plurality of feature points to be tracked in the target frame is equal to a count of the plurality of feature points to be tracked in the frame immediately following the target frame; and initiating a new repetition of the operations.

12. The method of claim 11, wherein the performing the video stabilization to the target frame based on the one or more first motion parameters includes:

performing video stabilization to the target frame by performing route planning or filtering based on the one or more first motion parameters.

13. The method of claim 11, wherein the estimating the one or more first motion parameters based on the remaining feature points includes:

obtaining current coordinates of the remaining feature points in the target frame;

obtaining prior coordinates of the remaining feature points in a frame prior to the target frame in the video;

comparing the current coordinates and the prior coordinates; and estimating the one or more first motion parameters based on a comparison result.

14. The method of claim 11, wherein the determining whether the plurality of feature points to be tracked in the target frame include at least one feature point relating to the moving object in the video includes:

determining current coordinates of the plurality of feature points in the target frame;

obtaining historical coordinates of the plurality of feature points in a source frame, the plurality of feature points being determined in the source frame;

estimating one or more second motion parameters based on the current coordinates and the historical coordinates of the plurality of feature points to be tracked in the target frame;

transforming the current coordinates of the plurality of feature points based on the one or more second motion parameters;

for each of the plurality of feature points to be tracked in the target frame, determining a difference between the historical coordinates and the transformed current coordinates of the feature point;

determining whether the difference is greater than a preset threshold; and in response to a determination that the difference is greater than the preset threshold, designating the feature point as the feature point relating to the moving object.

15. The method of claim 14, further comprising:

creating a data group configured to store the historical coordinates of the plurality of feature points;

wherein the removing the at least one feature point relating to the moving object includes:

removing the historical coordinates of the at least one feature point relating to the moving object from the data group; and wherein the designating the at least one supplement feature point and the remaining feature points as the plurality of feature points to be tracked in the frame immediately following the target frame in the video includes:
  adding historical coordinates of the at least one supplement feature point to the data group, wherein the historical coordinates of the at least one supplement feature point include coordinates that are transformed based on one or more fourth motion parameters associated with the target frame.

16. The method of claim 11, wherein the determining, in the target frame after the video stabilization, of the at least one supplement feature point that is different from the remaining feature points of the plurality of feature points to be tracked in the target frame includes:
  determining a plurality of candidate feature points in the target frame; and
  randomly selecting at least one of the plurality of candidate feature points as the at least one supplement feature point.

17. A non-transitory computer readable medium, comprising at least one set of instructions for video stabilization, wherein when executed by one or more processors of a computing device, the at least one set of instructions causes the computing device to stabilize a video frame-by-frame from a second frame of the video by repeating operations including:
  obtaining a target frame of the video, the target frame being a current frame to be stabilized in the video;
  obtaining a plurality of feature points to be tracked in the target frame;
  determining whether the plurality of feature points to be tracked in the target frame include at least one feature point relating to a moving object in the video;
  in response to a determination that the plurality of feature points to be tracked in the target frame include at least one feature point relating to the moving object in the video, removing the at least one feature point relating to the moving object;
  estimating one or more first motion parameters based on the remaining feature points of the plurality of feature points to be tracked in the target frame, the one or more first motion parameters including a homography matrix;
  performing video stabilization to the target frame based on the one or more first motion parameters;
  determining whether the target frame is a last frame of the video;
  in response to determining that the target frame is the last frame of the video, terminating the video stabilization;
  in response to determining that the target frame is not the last frame of the video,
    identifying, in the target frame after the video stabilization, at least one supplement feature point that is different from the remaining feature points of the plurality of feature points to be tracked in the target frame;
    designating the at least one supplement feature point and the remaining feature points as a plurality of feature points to be tracked in a frame immediately following the target frame in the video, a count of the at least one supplement feature point being equal to a count of at least one removed feature point so that a count the plurality of feature points to be tracked in the target frame is equal to a count of the plurality of feature points to be tracked in the frame immediately following the target frame; and
    initiating a new repetition of the operations.

18. The system of claim 1, wherein the video stabilization is performed to the frame immediately following the target frame based on historical coordinates of the at least one supplement feature point, and the historical coordinates of the at least one supplement feature point are determined based on coordinates of the one or more supplement feature points in the target frame after the video stabilization.

19. The system of claim 18, wherein
  the historical coordinates of the at least one supplement feature point include coordinates of the one or more supplement feature points in the target frame after the video stabilization; or
  the historical coordinates of the at least one supplement feature point include transformed coordinates of the one or more supplement feature points that are determined by transforming the coordinates of the one or more supplement feature points in the target frame after the video stabilization using one or more second motion parameters, the one or more second motion parameters being configured to determine whether the plurality of feature points include at least one feature point relating to the moving object in the video.

20. The system of claim 1, wherein the operations is used to stabilize, in real time, a video that is being captured, and when a image capture device is capturing a scene to generate a plurality of consecutive frames to form the video, from the second frame of the video, every time a new frame is generated, the at least one processor is configured to stabilize, in real-time, the new frame via the operations.

* * * * *